Aug. 30, 1932.  C. R. ROCHE  1,874,604
DRIVING APPARATUS FOR VEHICLES
Filed March 2, 1929
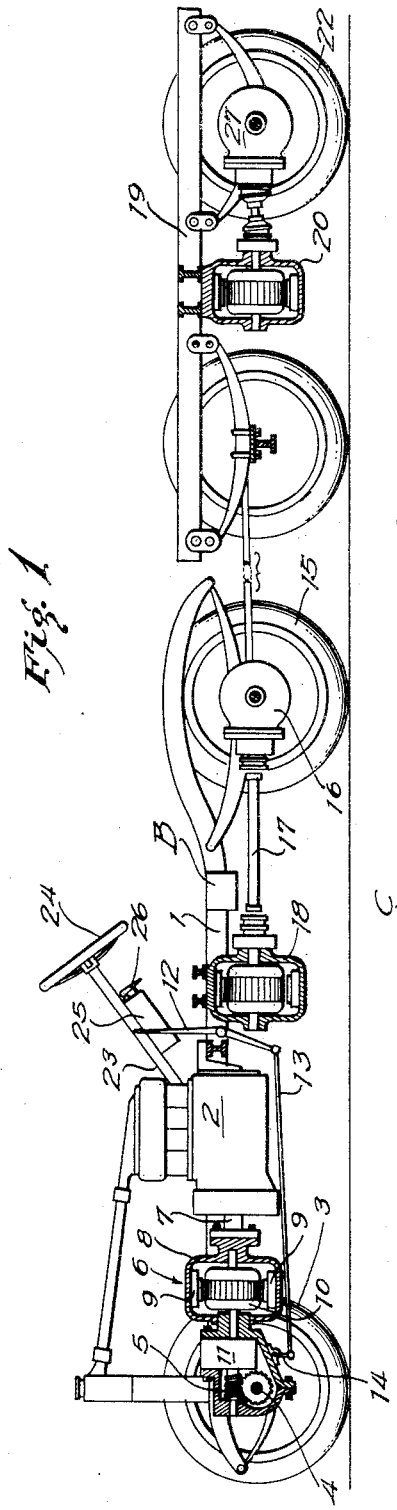
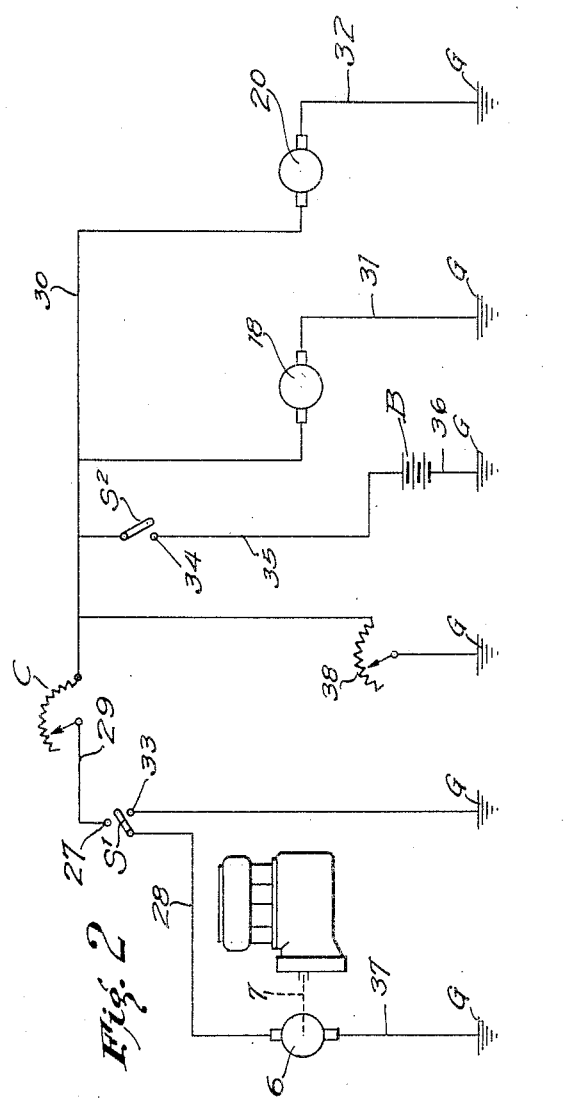
INVENTOR.
Clifton R. Roche
BY
Lyon & Lyon
ATTYS.

Patented Aug. 30, 1932

1,874,604

UNITED STATES PATENT OFFICE

CLIFTON R. ROCHE, OF LOS ANGELES, CALIFORNIA

DRIVING APPARATUS FOR VEHICLES

Application filed March 2, 1929. Serial No. 343,898.

This invention relates to driving apparatus for driving wheeled vehicles such as cars running on rails, automobiles or any other vehicles used with or without trailers. The type of apparatus to which this invention relates employs a prime mover or engine combined with electrical equipment. Heretofore, apparatus for this purpose has been employed which utilizes a prime mover such as a gas engine that drives a generator and the current produced by the generator drives an electric motor on the vehicle. That system is objectionable for the reason that it is relatively inefficient, as there is a loss in efficiency in transforming the power generated by the engine into electric current and another loss in efficiency in transforming the electric current back into mechanical energy at the motor.

The general object of this invention is to provide a driving apparatus of this general type having relatively high efficiency and having considerable flexibility in use, avoiding the necessity for the use of a mechanical transmission mechanism, and so constructed as to enable the driving of the automobile or vehicle and trailer to be effected at a plurality of points. In other words, one of my objects is to provide driving apparatus which will enable the driving power to be applied at will to a number of driving wheels or concentrated at a single point or set of driving wheels.

One of the objects of my invention is to provide driving apparatus of this type which will avoid the necessity for employing the usual driving shaft extending from the prime mover to the rear axle of the car, thereby avoiding the vibration which is incidental to the driving of such a long shaft, and also permitting greater freedom in the design of chassis due to the elimination of this driving shaft.

A further object of the invention is to improve the general construction of driving apparatus of this general type.

Further objects of the invention will appear hereinafter.

The invention consists in the novel parts and combination of parts to be described hereinafter, all of which contribute to produce an efficient driving apparatus for vehicles.

A preferred embodiment of the invention is described in the following specification, while the broad scope of the invention is pointed out in the appended claims.

In the drawing:

Figure 1 is a side elevation and partial section illustrating driving apparatus embodying my invention.

Figure 2 is an illustration of a wiring diagram which may be employed with my apparatus.

Before proceeding to a detailed description of the invention, it will facilitate the disclosure of the invention to state that in accordance with my invention I provide a prime mover, for example, a gas engine. This engine drives a set of driving wheels of the vehicle through an electric clutch. In order to effect this, the crank-shaft of the engine is attached either to the field or the armature of the electric clutch. In this way, when the engine is started up, the clutch operates as a flexible connection from the engine shaft to the primary set of driving wheels. There will be, of course, a certain amount of slippage between the two parts of the clutch, which slippage will generate an electric current. At another point, where driving wheels of the vehicle are driven, for example, attached to the same frame or on a trailer or trailers, I provide a motor, or motors, driven by the electric current generated by the slippage of the clutch. In this way the resistance at the clutch is utilized to generate power to assist in the driving of the vehicle. When the engine is driving at full speed, the electric clutch may be locked, that is to say, no slippage, or very little, may occur in the clutch, so that the primary driving wheels will be driven as though directly connected with the engine shaft.

When the motor attached to the secondary set of wheels is not to be used as a driving motor, for instance, when the electric clutch is locked, I am enabled to utilize this motor as an electric brake when desired. This motor can also be utilized as a generator and used as a means for charging the battery on the vehicle.

While it should be understood that the primary driving wheels may be located anywhere on the vehicle, in the present embodiment I have provided a fore-wheel drive as the primary drive, employing a motor for driving the rear wheels with the current generated by the slippage of the electric clutch. This same current may be utilized to drive motors on trailers which may be drawn along by the vehicle.

My apparatus is adapted for driving automobiles, passenger busses, trucks with or without trailers, street cars, trains, or any vehicle or train of vehicles which embody a prime mover or engine.

Referring more particularly to the parts, 1 represents the frame of a wheeled vehicle, for example, an automobile. This frame supports a prime mover or engine 2 which may be of a common type of gas engine. The present embodiment of the invention provides for driving the fore wheels 3 of the vehicle. These fore wheels may be driven through any suitable flexible connection such as disclosed in my Patent No. 1,535,497, granted to me on April 28, 1925 and are driven through the forward driving shaft 4. This driving shaft may be driven by a worm 5 and this worm is driven through an electric clutch 6 driven by the engine 2. The electric clutch includes two relatively rotatable parts, one of which carries field coils and the other of which is an armature. The engine shaft may be connected so as to drive either one of these rotatable parts. As illustrated, the engine shaft 7 is connected to a casing 8 carrying the fields 9 which rotate around an armature 10, the shaft of said armature being connected to the worm 5 through a reversing gear 11. The casing 8, of course, has considerable weight and this weight can be made sufficient to enable the casing to perform the proper functions of a flywheel for the engine.

The reversing gear 11 may be controlled from the driver's position, for example, through a lever 12 connected by a link 13 with a lever 14 that extends into the reversing gear and controls its operation. In one position of the lever 12 a drive in a forward direction would be imparted to the shaft 4, while the other position of the lever would control the reversing gear 11 so as to drive the worm 5 in a reverse direction.

Any desired mechanical connection from the motor to the secondary set of wheels may be employed. In the present instance the rear end of the frame 1 carries rear wheels 15 which may constitute a secondary set of driving wheels driven through a differential 16 actuated by a drive shaft 17. This driving shaft is connected with the differential in a front and rear direction and is provided at its forward end with a motor 18 for driving it, said motor being supported on the frame 1 from above.

When using the vehicle as a tractor for drawing a trailer 19, the trailer would be provided with a motor 20 similar to the motor 18 and connected through a differential 21 to the driving wheels 22 of the trailer.

The vehicle may be provided with the usual steering post 23 carrying a steering wheel 24. For the sake of simplicity I have shown hand-operated switches and a manually operated controller 25 with a controlling lever 26 for controlling the circuits passing through the controller. It should be understood, however, that any automatic switches may be employed at any of the points where I have indicated a hand-operated switch. Such automatic switches are now commonly employed for automatically forming the required circuits under certain predetermined conditions.

Any suitable wiring diagram may be employed which will enable the slippage of the clutch 6 to provide current for the motor 18. In Figure 2 I illustrate a diagram of wiring which may be employed for this purpose. In this view the dotted line represents the shaft 7 of the engine.

In starting up the vehicle, the slippage at the electric clutch 6 generates current that passes through conductor 28, switch $S^1$ which is closed at the contact point 27 so as to pass current through the conductor 29 and through a controller C to the motor at 18 and, if desired, through an extension conductor 30 to the motor 20 on the trailer. The current passes from the motors 18 and 20 by conductors 31 and 32 back to the ground G and the circuit is completed back to the electric clutch from the ground through conductor 37. The switch $S^1$ is provided with a contact 33 that is connected with the ground G. When the switch lever of the switch $S^1$ is on this contact, the electric clutch 6 will be short-circuited. This is the position of the switch for direct driving through the clutch and it operates to substantially prevent relative rotation occurring between the driving member of the clutch and the driven member.

The conductor 29 is provided with a switch $S^2$ the lever of which can co-operate with a contact 34 which will connect the conductor 30 with one side of a battery B through a conductor 35. The other side of the battery is connected by a conductor 36 with the ground G. By placing the switch lever of the switch $S^2$ on the contact 34, the battery current can flow through the motors 18 and 20 to assist in starting the vehicle.

A variable resistance 38 may be connected between the conductor 29 and the ground. As this resistance is decreased the motor 18, or motors 18 and 20, become short-circuited, causing them to operate as an electric brake.

When the switch $S^1$ is on contact 33, all the drive is taken through the primary set of driving wheels and the secondary set will pull the motor 18 and if run at sufficient speed this motor will act as a generator and by closing the switch $S^2$ to contact 34 this current may be used for charging the battery B.

The general mode of operation of this driving apparatus will now be briefly stated. The engine 2, rotating its shaft 7, rotates the casing 8 carrying the field 9 of the electric clutch 6, thereby, when the engine is started, generating electric current in the armature 10 which passes to the motors 18 and 20 through the switch $S^1$ engaging contact 27 and this current passes through the controller C, enabling the motors to be properly started with the generated current. The rotation of the armature 10 which occurs imparts movement through the worm 5 to the front wheels 3 of the vehicle, thereby driving the vehicle forward. This drive is, of course, assisted by the driving of the rear wheels 15 of the vehicle through the motor 18, and if a trailer is being drawn, the trailer may be driven partially through its own motor 20.

By utilizing the slippage of the clutch it will be seen that the work done at the clutch and which does not pass through the clutch, is made useful by utilizing the current generated to drive the motor 18 for the secondary drive of the vehicle, which boosts the primary drive occurring at the front wheels 3.

After the vehicle has been sufficiently accelerated, the driving of the motor 18, or the motors 18 and 20, may be discontinued by opening the circuit through this motor or motors and closing the circuit through the contact 33, thereby grounding the clutch generator 6. This throws all the driving load of the vehicle onto the forward wheels 3, and the motor 18, (or 18 and 20) is then free from driving requirements and may be utilized as a generator to charge the battery, and may further be utilized as an electric brake.

It will be seen that my invention avoids the necessity for employing a long drive shaft extending from the engine to the rear axle. This fact facilitates the use of chassis of different heights and wheel base as only an electric connection is required between the units. In other words, the chassis can be simply lengthened out at the frame between the engine and the motor 18. This avoids the undesirable whipping that sometimes occurs in a long drive shaft and greatly reduces the vibration imparted to the frame.

It should be understood that the means illustrated for connecting the motor 18 to the driving wheels is merely for the purpose of illustration and any desired driving connection may be employed between this motor and the driving wheels 15 and the motor may be mounted in any desired position. The arrangement and construction of this motor 18, if desired, may be of such a character as to enable a very low chassis construction to be employed.

The braking effect exerted at the motors 18, 20 and other motors on other trailers forming a train can be applied to all the motors. This is advantageous because it enables the trailers to be held back by their brakes in descending a hill to keep them from running down onto the automobile at the front of the train that is furnishing the traction power. It would also prevent trailers from running into the rear end of the automobile or colliding with each other in case it is necessary to apply the brakes suddenly to the automobile drawing the trailers.

It will be also evident that through the employment of the switch $S^1$ and the controller C as much of the driving power as desired may be applied through the rear wheels. In other words, this apparatus enables the drive to be distributed between the front wheels and the rear wheels 15 and when the vehicle is proceeding at its highest speed, the entire driving can occur through the forward wheels, giving the advantages of this type of drive.

By reason of the fact there is no direct connection between the engine shaft and the shaft that drives the rear wheels of the automobile which have a differential drive, an automobile having my improvement can readily be pulled out of a hole in the road if it becomes stalled. This is possible because, by short-circuiting the electric clutch all of the energy of the engine can be imparted to the forward wheels. In other words, if the rear end of the automobile is stalled all of the power of the engine can be exerted on the forward wheels to pull the car out of the hole. This advantage is augmented if the forward wheel drive does not include a differential. Where stalled wheels are driven through a differential, if one of the wheels is slipping, it is impossible to impart any power to the other wheel.

It is understood that the embodiment of the invention described herein is only one of the many embodiments this invention may take, and I do not wish to be limited in the practice of the invention, nor in the claims, to the particular embodiment set forth.

What I claim is:

1. In driving apparatus for driving wheeled vehicles, the combination of an engine, driving wheels, an electric clutch located forward of the engine and between the engine and said driving wheels for driving the said wheels from the engine, said clutch having two relatively rotatable parts including an armature and a field operating to generate an electric current when relative rotation of said parts occurs by slippage of said clutch, other driving wheels with a motor having a shaft independent of the engine shaft, for driving the same, and an electric circuit connecting said motor with the clutch to drive the said motor with current generated by the slippage of said clutch, said electric clutch having means for short-circuiting the same to prevent said slippage and thereby throw all the driving force developed by the engine onto the forward driving wheels.

2. In driving apparatus for driving wheeled vehicles, the combination of an engine, forward driving wheels, an electric clutch through which said forward driving wheels are mechanically driven from the engine, said clutch having two relatively rotatable parts including an armature and a field operating to generate an electric current when relative rotation of said parts occurs by slippage of said clutch, other driving wheels with an electric motor for driving the same, said electric motor having a shaft independent of the engine and an electric circuit connecting said motor with the clutch to drive the said motor with current generated by the slippage of said clutch, said clutch having electric connections including a switch for short-circuiting the said rotatable part that is connected with the first named driving wheels to drive the same from the engine without substantial slippage.

3. In driving apparatus for driving wheeled vehicles, the combination of an engine, forward driving wheels, an electric clutch through which said forward driving wheels are mechanically driven from the engine, said clutch having two relatively rotatable parts including an armature and a field, operating to generate an electric current when relative rotation of said parts occurs by slippage of said clutch, other driving wheels with an electric motor for driving the same, said electric motor having a shaft independent of the engine, an electric circuit connecting said motor with the clutch for driving the said motor with current generated by the slippage of said clutch, a means for cutting out said electric circuit and shorting the clutch so that all the drive will be through the forward driving wheels, a storage battery, means for switching in an electric circuit from the motor to the battery, to utilize the electricity generated by the motor which acts as a dynamo when all the driving of the vehicle is done through the forward driving wheels, for charging the battery.

4. In driving apparatus for driving wheeled vehicles, the combination of an engine, forward driving wheels, an electric clutch through which said forward driving wheels are mechanically driven from the engine, said clutch having two relatively rotatable parts including an armature and a field, operating to generate an electric current when relative rotation of said parts occurs by slippage of said clutch, other driving wheels with an electric motor for driving the same, said electric motor having a shaft independent of the engine, an electric circuit connecting said motor with the clutch for driving the said motor with current generated by the slippage of said clutch, a means for cutting out said electric circuit and shorting the clutch so that all the drive will be through the forward driving wheels, a varying resistance for shorting said electric motor so that it will act as an electric brake.

5. In driving apparatus for driving wheeled vehicles, the combination of an engine, driving wheels, an electric clutch through which said driving wheels are mechanically driven from the engine, said clutch having two relatively rotatable parts including an armature and a field operating to generate an electric current when relative rotation of said parts occurs by slippage of said clutch, other driving wheels including trailer wheels having a motor on the trailer for driving the same, an electric circuit connecting said motor with the clutch to drive the said motor with current generated by the slippage of said clutch, and means for short-circuiting the electric clutch circuit to prevent slippage at the same and enable all the power of the engine to be delivered at the front wheels.

6. In driving apparatus for driving wheeled vehicles including a trailer, the combination of an engine, driving wheels, an electric clutch through which said driving wheels are mechanically driven from the engine, said clutch having two relatively rotatable parts including an armature and a field operating to generate an electric current when relative rotation of said parts occurs by slippage of said clutch, other driving wheels including trailer wheels having a motor on the trailer for driving the same, an electric circuit connecting said motor with the clutch to drive the said motor with current generated by the slippage of said clutch, and means for short-circuiting the electric clutch circuit to prevent slippage at the clutch.

Signed at Los Angeles, California, this 18th day of February, 1929.

CLIFTON R. ROCHE.